United States Patent [19]

Lee

[11] Patent Number: 5,244,747

[45] Date of Patent: Sep. 14, 1993

[54] THERMOPLASTIC CORE AND METHOD OF USING

[75] Inventor: Jeong M. Lee, Seoul, Rep. of Korea

[73] Assignee: Bauer Hammar International, Inc., Erie, Pa.

[21] Appl. No.: 435,621

[22] Filed: Nov. 13, 1989

[51] Int. Cl.⁵ .............................................. B29C 33/44
[52] U.S. Cl. ..................................... 428/614; 428/327; 428/407; 264/24; 264/317
[58] Field of Search ............... 428/614, 327, 405, 407; 252/513; 264/24, 317, DIG. 44

[56] References Cited

U.S. PATENT DOCUMENTS

| | | | |
|---|---|---|---|
| 3,238,355 | 3/1966 | Van Eeck | 252/513 |
| 3,476,530 | 11/1969 | Ehrreich et al. | 252/513 |
| 3,491,056 | 1/1970 | Saunders et al. | 252/513 |
| 3,666,689 | 5/1972 | Groszek et al. | 252/513 |
| 3,708,387 | 1/1973 | Turner et al. | 252/513 |
| 3,709,835 | 1/1973 | Forster | 252/513 |
| 3,725,308 | 4/1973 | Ostolski | 252/513 |
| 3,746,662 | 7/1973 | Adelman | 252/513 |
| 3,767,519 | 10/1973 | Kojima et al. | 252/513 |
| 3,882,220 | 5/1975 | Ryder | 264/DIG. 44 |
| 3,996,167 | 11/1976 | Brown | 252/513 |
| 4,462,919 | 7/1984 | Saito et al. | 428/327 |
| 4,687,705 | 8/1987 | Miyatsuka et al. | 428/407 |
| 4,776,979 | 10/1988 | Kageyama | 428/405 |
| 4,927,712 | 5/1990 | Lhymn et al. | 428/614 |
| 4,965,160 | 10/1990 | Nagatsuka et al. | 428/407 |

FOREIGN PATENT DOCUMENTS

| | | | |
|---|---|---|---|
| 1-192517 | 8/1989 | Japan | 264/317 |
| 8911551 | 11/1989 | World Int. Prop. O. | |

*Primary Examiner*—George Wyszomierski
*Attorney, Agent, or Firm*—Ralph Hammar

[57] ABSTRACT

Thermoplastic cores reinforced with strong magnetic shots or/and particles are molded and then thermosets are molded around this thermoplastic core. The thermoplastic core is decored by a magnet at a high temperature above the softening point of thermoplastic matrix to produce a hollow curved internal space.

13 Claims, No Drawings

THERMOPLASTIC CORE AND METHOD OF USING

BACKGROUND INFORMATION

Fusible core materials for producing a hollow plastic part must be strong, flowable, and light. The development work of synthetic plastic core has so far been unsuccessful because of the difficulty of decoring, i.e., the plastic core material does not melt away easily and cleanly. Generally the plastic materials are light but they flow under a shear force due to the high viscosity of polymer phase. The present invention intends to overcome the preceding decoring problem by generating a shear force via magnetic force such that a clean melt-out without any residual polymer materials on the inside wall surface can be achieved.

SUMMARY

The weight of fusible core materials is reduced by using thermoplastics as a matrix phase and, for the purpose of decoring or melt-out, magnetic materials selected from the group consisting of shots, particles, and short fibers are employed as reinforcing agent. The thermoplastic core is coated with a mold-release film prior to thermoset molding to improve the incompatibility between the thermoplastic core and thermoset mold. The thermoplastic core in the thermoset part is decored by heating, preferably by induction coil for efficiency. When a magnet is near the embedded core, magnetic reinforcing agents are pulled out of the hollow internal space by a magnetic force and flowable thermoplastic matrix resin is decored by shear force generated by reinforcing agents. Preferred magentic reinforcing agents are iron, steel, nickel, cobalt, their base alloys, ferrites, garnets, permalloy, mumetal, rare earth magnets, and any magnetic materials including any magnetic materials either coated or filled with magnetic materials. The method of magnetic decoring can be applied to fusible core alloys reinforced with magnetic shots, particles, or fibers.

DETAILED DESCRIPTION OF THE PREFERRED EMBODIMENTS

The weight reduction of fusible core materials is achieved by using plastics and strength is provided by reinforcing agents consisting of shots, particles, or fibers. The melting point of reinforcing agent must be higher than the thermoplastic matrix phase and the reinforcing material must be bondable to the polymer matrix phase. The reinforcing agent can be any strong magnetic materials, i.e., metals ceramics, polymers, or composites. The preferred magnetic materials are iron, steel, nickel, cobalt, their base magnetic alloys, ferrites, garnets, Alnico TM, platinumcobalt, samarium-cobalt, Permalloy TM, Mumetal TM, Supermalloy TM, rare earth magnets, ferrosilicon, or any other magnetic materials.

The trademark Alnico is a magnetic alloy consisting of aluminum, nickel, and cobalt. Permalloy is a magnetic alloy consisting of nickel and iron. Supermalloy consists of nickel, molybdenum, iron, and manganese. Mumetal designates a magnetic alloy consisting of nickel, iron, copper, chromium, and manganese. For instance, strong plastics, metals, or ceramics can be coated with a magnetic film or filled with magnetic materials.

Since the core must be fusible, thermoplastics are used as core and thermosets are preferably molded around the thermoplastic core. The decoring is done by heating the molded part with the core embedded and when the temperature reaches high enough for thermoplastics to be flowable, the electromagnet is energized to attract magnetic reinforcing agents together with thermoplastics. The decoring temperature is quite critical since it controls the polymer viscosity. When shots, particles, or fibers are pulled by a magnet, a shear force is exerted on the softened/flowable polymer phase via shots, particles, or fibers. A clean decoring having no residual polymer materials on the inside hollow wall surface requires a fairly high viscosity but not too high to impede the flowability through curved and complex geometry. Therefore, for each polymer type, there is an optimum decoring temperature range in terms of flowability and clean decoring.

The size of shots/particles is limited by the geometrical complexity of the desired parts, i.e., the finer the details, the smaller the size. The viscosity or flowability increases with the decrease of size and the strength rises with the shot/particle size decrease. Hence, there is an optimum size of shots, particles, or fibers considering viscosity, strength, and decoring behavior.

As the molded plastic part must be stable at decoring temperatures, thermosets are preferred as a molded part, although high melting/softening point thermoplastics can be used as a molding materials for final part as long as they are stable at decoring temperatures.

The molded thermoplastic core surface is given a mold-release coating to enhance the clean decoring behavior. For example, a silicon-based mold-release agent is useful in enhancing the incompatibility between thermosets and thermoplastic core. Any mold-release agent such as fluorocarbon-based or carbon-based one can be used if it improves the incompatibility between thermoset mold and thermoplastic core.

As reinforcement, the spherical shot is not the only geometry but also included are particles, short fibers, cubes, or any aggregates of random geometry. The reinforcing phase can even consist of a mixture of shots, particles, short fibers, cubes, and other aggregates. It may also consist of some of the above reinforcing agents. The amount of nonspherical reinforcing agents is desired to be small enough to maintain the good flowability and surface smoothness. The reinforcing agents are often given a special size coating to make them bondable to specific thermoplastic matrix phases.

The amount of reinforcing agent is greater than about 10% by volume for strength improvement and less than about 60% by volume for moldability/flowability. For the purpose of decoring a large amount of magnetic reinforcing agent is desirable.

The technique of magnetic decoring can be applied also to shot or particle-reinforced fusible alloys when the reinforcing shots, particles, or short fibers are magnetic such as steel, iron, nickel, cobalt, their base magnetic alloys, ferrite, garnets, ferrosilicon, alnico, mumetal. permalloy, or any other magnetic materials. When the fusible alloys are melted, an electromagnet is energized to attract magnetic shots/particles/fibers while the tin-based or bismuth-based matrix alloys are fused out in oil, for example.

EXAMPLE 1

Thermoplastic resins reinforced with 10 to 60 volume % steel shots or particles are molded as a core and then thermoset phenol resin or thermoset polyester is molded around the thermoplastic core. The decoring is done by heating the thermoplastic core by induction coil heating and a magnet is used to remove the softened/ melted core. The kinds of thermoplastic resins are:
(1) Polycarbonate
(2) Polypropylene
(3) High density polyethylene
(4) Thermoplastic polyester
(5) ABS
(6) Acetal
(7) Nylon
(8) Polystyrene

EXAMPLE 2

Glass fiber-reinforced polyetheretherketone is molded around the shot-reinforced polyester thermoplastic core and then decored by a magnet at high temperatures below the softening point of polyetheretherketone but above the softening point of polyester. The shot content is 10 to 60% by volume and the shot material is steel.

EXAMPLE 3

Tin-based tin-bismuth alloy, for example 90 wt. % tin-10 wt .% bismuth, reinforced with 30 wt. % steel shots is used as a core and thermoset is molded around this alloy core. The decoring is performed in oil using a magnet at about 200 to 230 degree C. Eutectic tin-bismuth alloy reinforced with 30 wt. % steel shots is used as a core and then a thermoplastic resin in molded around this core. The decoring is done in oil using a magnet at about 140 to 155 degree C. Tin-based tin-lead-antimony alloy reinforced with steel shots is also used as a core for thermoset molding and decored by a magnet.

While I have shown only certain preferred embodiments of my invention, many modifications will occur to those skilled in the art and I, therefore,wish to have it understood that I intend in the appended claims to cover all such modification as fall within the true spirit and scope of my invention.

What is claimed is:

1. A method of molding an internally hollow plastic article using a thermoplastic core, said method comprising the steps of: molding a thermoplastic core to produce a hollow internal space in a plastic molded part, sand core consisting essentially of a thermoplastic matrix phase and reinforcing magnetic agents, overmolding a plastic around said core, and decoring said thermoplastic core by a magnet at temperatures higher than the softening point of said thermoplastic core.

2. A method according to claim 1, wherein said reinforcing magnetic agents are selected from the group consisting of iron, steel, nickel, cobalt, their base magnetic alloys, ferrites, garnets, rare earth magnets, ceramics coated or filled with magnetic materials, plastics coated or filled with magnetic materials, metals coated or filled with magnetic materials, and composites coated or filled with magnetic materials.

3. A method according to claim 1, wherein the content of said magnetic agents is less than about 60 volume % for flowability and greater than about 10 volume % for strength improvement.

4. A method according to claim 1, wherein the geometry of said magnetic agents is spherical.

5. The process of claim 1, which comprises heating the overmolded plastic to the softening temperature of the core and using an electromagnet or a permanent magnet to pull the core out of the overmolded plastic wherein said overmolding plastic is a thermoset or thermoplastic.

6. A method according to claim 1, wherein said thermoplastic core is given a mold-release coating enhancing the imcompatibility between the overmolded part and the thermoplastic core being selected from the group consisting of silicon-based, fluorocarbon-based, and zincstearate-based.

7. A thermoplastic core capable of producing a hollow internal space in a plastic body which is molded around said core, said core being capable of being melted out or decored at temperatures which do not damage said body.

8. The core of claim 7 in which the decoring or melt-out of the core is capable of being assisted by magnet-means acting on magnetic reinforcing particles bonded in said core.

9. The core according to claim 8, wherein the geometry of said magnetic particles is nonspherical.

10. The core according to claim 8, wherein said magnetic particles consist of a major amount of spherical shots and a minor amount of nonspherical particles selected from the group comprised of short fibers, platelets, cubes, and irregular shape aggregates.

11. The core of claim 7 in which the decoring or melt-out of the core is assisted by electromagnetic induction heating of the core during decoring.

12. The core of claim 7 which has its melt out improved by a coating of mold release which has been applied to said core before said plastic body is molded around said core.

13. A fusible thermoplastic core for use with lost core plastic molding technology, said core consisting essentially of a thermoplastic matrix phase and reinforcing magnetic shots of spherical shape, said core being overmolded with a thermoset or a thermoplastic, and said core is capable of being decored by a magnet at temperatures higher than the softening point of said thermoplastic core.

* * * * *